United States Patent [19]

Zito, Jr.

[11] 4,117,204
[45] Sep. 26, 1978

[54] SULFITE ANOLYTE AND PERSULFATE CATHOLYTE FUEL CELL

[75] Inventor: Ralph Zito, Jr., Durham, N.C.

[73] Assignee: General Engineering Labs., Durham, N.C.

[21] Appl. No.: 856,502

[22] Filed: Dec. 1, 1977

[51] Int. Cl.² .............................................. H01M 8/18
[52] U.S. Cl. ............................................. 429/19; 429/34
[58] Field of Search ....................... 429/17, 19, 27, 46, 429/34, 12, 14, 15

[56] References Cited

U.S. PATENT DOCUMENTS

| 3,920,474 | 11/1975 | Zito, Jr. et al. | 429/15 |
| 3,996,064 | 12/1976 | Thaller | 429/34 |
| 4,032,693 | 6/1977 | Lindstrom | 429/17 |
| 4,053,684 | 10/1977 | Zito, Jr. et al. | 429/15 |

*Primary Examiner*—Anthony Skapars
*Attorney, Agent, or Firm*—Jerry Cohen

[57] ABSTRACT

Fuel cell liquid-liquid system comprising aqueous anolyte solution containing sulfite or bisulfite ion in high concentration recirculating through the anolyte compartment of a two electrolyte fuel cell. After converting its chemical energy to electrical energy in the cell, the spent anolyte is readily reactable to useful new products or reconstituted to fresh anolyte for re-use in the fuel cell. A class of distinctly advantageous embodiments within the general scope of the invention produces a re-usable effluent mixture of spent anolyte and catholyte to avoid the cost of handling the two effluent liquids separately, while gaining the economic advantage of maximum utilization of both fluids. The same combinable effluent characteristic makes the system tolerant to molecular diffusion or other leakage across anolyte/catholyte separating barriers. Reactions involved in electrochemical energy conversion are controllable and operable without resort to elevated temperatures or catalysis and utilize inexpensive and relatively safe chemicals.

1 Claim, 4 Drawing Figures

SULFITE ANOLYTE AND PERSULFATE CATHOLYTE FUEL CELL

BACKGROUND OF THE INVENTION

The present invention relates to fuel cells.

Many of the problems which have hindered the widespread practical application of fuel cells since their invention in 1850 can be avoided through the use of liquid system fuel cells, at least in the fuel feed portion thereof — feeding and withdrawing a liquid electrolyte from the electrochemical reaction chamber. The present invention comprises the discoveries that operation can be maintained in such a fuel cell over a long useful life if solid precipitation is avoided and that the economics of such a cell can be brought into practical range through the provision of a use for spent anolyte and catholyte mixed together and/or the provision of easily regenerable spent electrolyte. A sulfite based anolyte, together with appropriate catholyte meets these requirements.

It is a principal object of the invention to provide a fuel cell system affording the characteristics of total liquid operation and ease of handling of reagents and effluent.

It is a further object of the invention to provide a fuel cell system affording adequate energy storage and power delivery, in relation to weight, volume and cost to power small electrical appliances such as saws, lights, mowers, shears, outboard motors and the like consistent with the foregoing first object.

It is a further object of the invention to provide a fuel cell system affording adequate energy storage and power delivery, in relation to weight, volume and cost to power large electrical loads such as traction and vehicle motors, furnaces, and the like in relation to the foregoing first object.

It is a further object of the invention to provide a fuel cell system which is tolerant to molecular diffusion between anolyte and catholyte multi-electrolytes consistent with one or more of the foregoing objects.

It is a further object of the invention to provide a fuel cell system allowing a common effluent mixing from its anolyte and catholyte consistent with one or more of the foregoing objects.

It is a further object of the invention to provide a fuel cell system affording ease of regenerability of its effluent consistent with one or more of the foregoing objects.

SUMMARY OF THE INVENTION

A unit cell of the fuel cell system comprises anolyte and catholyte compartments with respective anode and cathode electrodes therein. The compartments are separated by ion transport means such as a porous membrane. A liquid fuel reducing agent is fed to the anolyte, electrochemically reacted in the anolyte compartment, at the anode and withdrawn from the compartment. A liquid oxidizer is fed to the catholyte compartment, electrochemically reacted at the cathode and withdrawn. Anolyte and catholyte polar solvents carry the respective fuel and oxidizer components in solution.

The fuel is a sulfite (including sulfites and bisulfite) salt and the oxidation of this salt to the next valence state by forming the corresponding sulfate is the main anode reaction. Starting sulfite salts are preferably selected from the group consisting of sodium sulfite, potassium sulfite and ammonium sulfite and corresponding bisulfites. These are inexpensive solutes and are readily dissolved to high concentrations in water or other suitable polar solvents.

The sulfite preferably comprises 50% by weight of the starting anolyte solution and concentrations of 20 to 50% are preferably maintained throughout a complete cycle of operation to limit polarization effects and maintain high drain rates. Concentration can go down to as low as 5% for low drain rate uses (0.1–0.2 Amps per sq. in.)

Stabilizing agents such as glycerine, glutamate, or sucrose are added to the sulfite solution to stabilize it. The stabilizer would be 2–5% of the total solution.

Oxidizing agents usable with the sulfite are indicated by the following alternative fuel cell reactions.

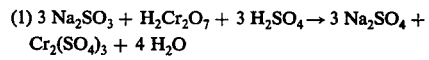

producing 1.2 volts* (*open circuit, theoretical) and affording 94 watt-hours per pound ( of reagents) energy stored.

(2) $K_2SO_3 + H_2O + (NH_4)_2S_2O_8 \rightarrow K_2SO_4 + (NH_4)_2SO_4 + H_2SO_4$ producing 1.1 volts* and affording 73 watt-hours per pound**.

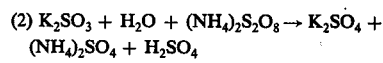

1.2 volts* 75 watt-hours/lb**

(4) $Na_2SO_3 + H_2O_2 \rightarrow Na_2SO_4 + H_2O$ 1.0 volts* 195 watt-hr/lb**

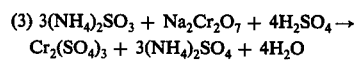

1.1 volts* 73 watt-hr/lb**

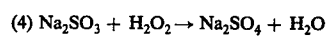

1.3 volts* 115 watt-hr/lb**

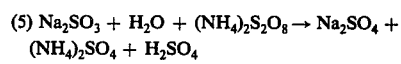

0.6 volts* 35 watt-hr/lb**

1.2 volts* 75 watt-hr/lb**

In the all liquid system employing sulfite-dichromate reaction the reagents are all regenerable in principle.

The energy producing reaction (given in equation (1) above) starts with the reagents $Na_2SO_4$ and $Cr_2(SO_4)_3$ in the effluent.

In the generation of chromic trioxide $CrO_3$, (chromic acid), a solution of the following composition is employed. (Electrochemical Engineering, C.L. Mantell, McGraw-Hill Series):

$Cr_2(SO_4)_3$: 27%
$H_2SO_4$: 12%
$H_2O$: 51%

The regeneration by electrolysis of this solution results in $CrO_3$: 6.8%
$Cr_2(SO_4)_3$: 13.2%
$H_2SO_4$: 22%
$H_2O$: 58%

The process evidently has an acceptable efficiency if not more than 50% of the $Cr_2(SO_4)_3$ is reclaimed in any one batch. Consequently this would merely correspond to a continuing capital investment of chromium salts.

The sulfite-persulfate reaction [(5) above] produces sulfate ions in both anolyte and catholyte. The various sulfate species are separable and, if desired, common cation sulfite and persulfate solute salts can be used for anolyte and catholyte to produce, e.g. $Na_2SO_4$ and $H_2SO_4$ where Na is the common cation.

The voltages and energy availability stated for the foregoing equations are based on the assumption of an acid electrolyte in each case. In some instances alkaline electrolyte is preferred, particularly for anolyte and/or catholyte in equation (4).

It will be understood that the overall chemical equation serves as a mere materials balance statement and does not describe the respective electrochemical reactions occurring in the fuel cell using the combinations given above. For instance, equation (4) given above breaks down into the two sub-equations:

(4a) $Na_2SO_3 + H_2O \rightarrow Na_2SO_4 + (2H^+) + 2e$ 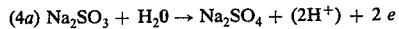

to express the anode reaction, the "2 e" signifying two electrons given up to the anode conductor and external circuit, and (4b) $H_2O_2 + 2H^+ + 2e \rightarrow 2H_2O$ 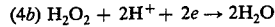

to express the cathode reaction where two electrons are taken from the cathode conductor and external circuit.

Ammonium and alkali metal sulfite salts have sufficient solubility in water to be useful for purposes of the present invention without solubilizing or suspension aids and are accordingly preferred and distinctly advantageous. The range of soluble bisulfites is broader and includes most metal bisulfites — e.g. iron, copper, aluminum, magnesium, lead, tin bisulfites. The bisulfite has a positive advantage as a hydrogen ion source for certain catholytes which otherwise require a concentrated acid environment.

Still other features objects and advantages will be apparent to those skilled in the art from the foregoing general summary or the following detailed description taken in conjunction with accompanying drawings wherein:

DETAILED DESCRIPTION OF PREFERRED EMBODIMENTS

Figure 1:
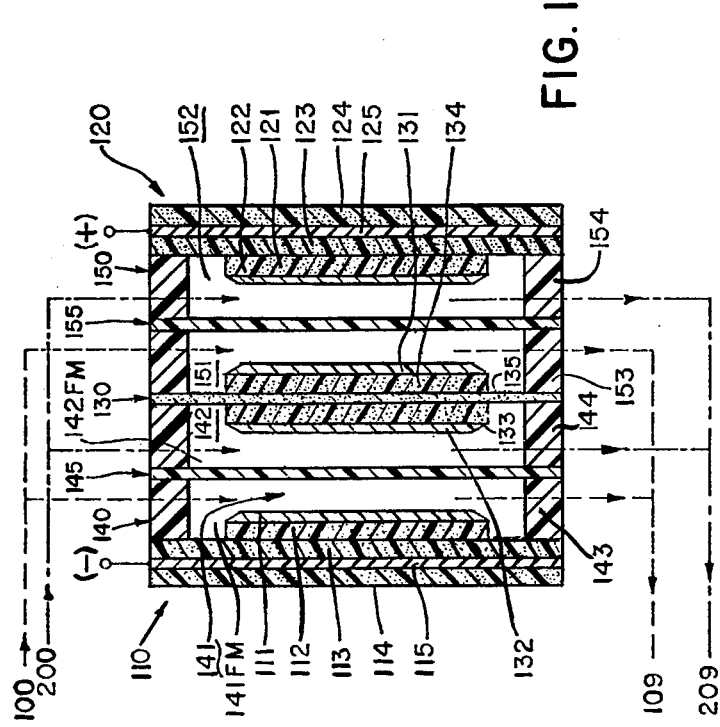
FIG. 1 is a side view diagrammatic sketch in longitudinal section form, a fuel cell in stacked array form, for utilizing the present invention.

Referring now to FIG. 1, there is shown a fuel cell 100 comprising a stacked array of unit cells, made up of an end anode electrode 110, and end cathode electrode 120 and a bi-polar mid electrode 130 forming first and second unit cells, 140 and 150, respectively in electrical series and fluid parallel (i.e., parallel electrolyte feed via branched tubes 100 and 200 for anolyte and catholyte respectively, parallel electrolyte withdrawal for anolyte and catholyte respectively via branched tubes 109 and 209).

An ion transport membrane 145 divides cell 140 into anolyte compartment 141 and catholyte compartment 142. Similarly, a membrane 155 divides cell 150 into anolyte compartment 151 and catholyte compartment 152.

While only two cells are shown in the stack for purposes of illustration, it will be appreciated that many more cells can be incorporated in such stack on the same principles, or alternatively, the invention can be practiced with a single unit cell. It is also within the scope of the invention to provide undivided unit cells with a single electrolyte compartment for sulfite anolyte, the oxidizer being fed in a non-liquid form. Also within the general scope of the invention are cell arrays in electrical parallel and/or fluid series and cells with discontinuous as well as continuous sulfite anolyte circulation.

Returning to the description of the preferred embodiment of FIG. 1, the end anode electrode comprises a surface layer 111 of active charcoal on a conductive substrate 112 which is in turn bonded to a laminated back-up electrode comprising conductive substrates 113, 114 which are sandwiched about an expanded metal screen 115.

Similarly, cathode electrode 120 comprises a charcoal coat 122 on a conductive substrate 121 which is in turn bonded to a laminated back-up electrode which comprises conductive substrates 123, 124 sandwiched about an expanded metal screen 125. Bi-polar mid-electrode 130 has charcoal faces 131, 132 bonded to conductive substrates 133, 134 which are sandwiched about a central conductive substrate 135.

Figure 2:
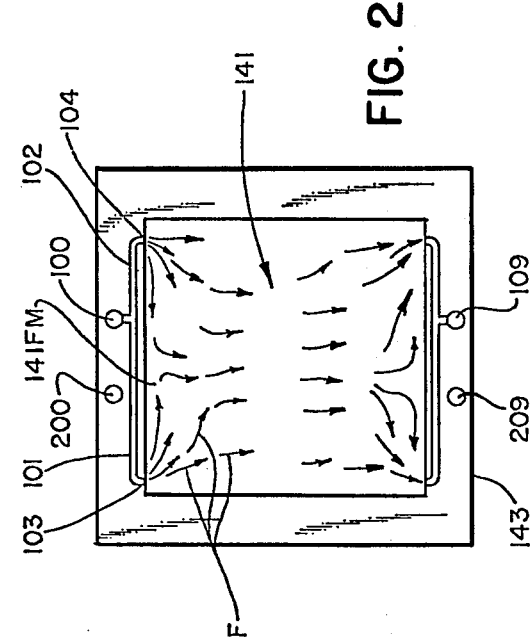
FIG. 2 is a frontal view of one of the gasket members shown in cross-section form in FIG. 1 illustrating a preferred form of fluid feed and withdrawal.

Frame gaskets 143, 144, 153, 154 space the electrodes and membranes and complete the enclosure of slab-like electrolyte compartments 141, 142, 151, 152 serving as walls therefor. The gaskets can also provide conduits for feed and return of electrolyte as shown in FIG. 2 where gasket 143, serving as side wall for compartment 141 carries feed line 100 which branches out to feed anolyte to the upper corners of compartment 141 and return line 109 which receives anolyte withdrawn from the lower corners of compartment 141. Catholyte feed and return lines 200 and 209 pass through gasket 143 and membrane 145 to gasket 144 where lines 200 and 209 branch out to serve compartment 142. The FIG. 2 arrangement would involve lines 100, 200, 109, 209 passing wholly longitudinally through the top and bottom edges (or side edges, if desired) of a stacked array to provide parallel feed and withdrawal of electrolytes. The arrows in FIG. 1 for electrolyte feed and withdrawal are merely schematic indications of parallel flow.

However, side tubes extending perpendicular to the direction of cell stacking, can be used to feed and withdraw electrolyte in lieu of the longitudinal tub arrangement indicated by FIG. 2.

The conductive substrates 113, 114, 112, 133, 135, 134, 121, 123, 124 comprise hot pressed mixtures of plastic and carbon, the plastic being polyvinylidene fluoride, (PVF), polyvinyl chloride, polyethylene or teflon, PVF being preferred and the carbon being a finely divided conductive form such as graphite and in a mixture of about 50% graphite — 50% PVF by weight. The layers 111, 132, 131, 122 are pressed into their respective substrates 112, 133, 134, 121 and the laminates 113, 114, 115 and 123, 124, 125 are separately hot pressed. Then the final assemblies of electrodes 110, 130, 120 are completed by hot pressing.

The membranes 145, 155 are preferable 3 mil thick porous, electrochemical grade polypropylene film.

The parts require machining, to make fluid passages and tie rod holes therein, and application of sealants prior to assembly. Then they are assembled as indicated in FIG. 1 and held in compression by tie rods to form a block-like compact package.

It is important to assure uniformity of electrolyte flow through the anolyte and catholyte compartments over the electrode surfaces. The cell construction enhances such uniformity of flow, as shown in FIGS. 1-2 wherein a feed manifold 141FM is provided in anolyte compartment 141 and a feed manifold 142FM is provided in the catholyte compartment 142FM. Similar return manifolds are provided at 141RM and 142RM for the respective compartments. FIG. 2 indicates flow pattern (Arrows F) for anolyte compartment 141. The feed tube 100 branches into lateral delivery tubes 101, 102 with respective corner exits at ends of manifold 141FM at the upper corners of compartment 141. Typical cross-section dimensions for manifold 141FM are 1/16 inch square and the thickness of the central portion of compartment 141, established by separation of the anode surface 111 from the surface of membrane 145, is typically 1/64 inch. The manifold and lateral manifold flow pattern is thus intrinsically established with minimal extraneous structure for this purpose.

Spacers (not shown) are set in the anolyte and catholyte compartments to establish a uniform spacing of anode and cathode electrodes from the thin barriers 145, 155. The spacers can have the form of ribs on the electrodes, corrugations or channels in the electrodes, net with raised crossovers between intersecting synthetic fiber threads (e.g. polypropylene).

Typical manufacturing conditions which have been used for making cells of the type shown in FIGS. 1-2 are:

(1.0) for making sheets 112, 133, 134, 121
  (1.1) Mix:
  55% Dixon grade 1175 graphite
  5% Dixon grade XC72 graphite which has been pulverized to go through a 40 mesh screen
  40% PVF copolymer (Kynar grade 3584)
  (1.2) Blend (PK blender without agitator bar) 6 minutes
  (1.3) Sift to break up clumps
  (1.4) Trowel a slab 3/16 thick
  (1.5) Preheat at 400° F for 7 minutes
  (1.6) Press at 400° F, 256 psi for 7 minutes
  (1.7) Cool at 50° F, 256 psi for 7 minutes
  (1.8) Release
(2.0) for making sheets 114, 120
  (2.1) Mix 50%, 3584 Kynar (PVF copolymer) with 50% Dixon Grade 1112 graphite. Sieve PVF copolymer to break up clumps.
  (2.2) Blend for 3 minutes in PK blender without agitator bar plus 3 minutes with agitator bar.
  (2.3) Sift to break up clumps.
  (2.4) Trowel a slab 0.100 in thick
  (2.5) Preheat for 7 minutes at 350° F
  (2.6) Press for 7 minutes at 400° F at 256 psi.
  (2.7) Cool for 7 minutes at 50° F at 256 psi
  (2.8) Release
(3.0) for making sheets 113, 130, 123
  (3.1) Mix 40% PVF copolymer Kynar grade 3584 with 60% Dixon grade 1112 graphite. Sieve copolymer to break up clumps.
  (3.2) Blend as in (2.2)
  (3.3) Sift as in (2.3)
  (3.4) Trowel a slab as in (2.4)
  (3.5) Preheat as in (2.5)
  (3.6) Press as in (2.6)
  (3.7) Cool as in (2.7)
  (3.8) Release
(4.0) To coat sheets 112, 133, 134, 121 (Coating = 122, 131, 132, 111)
  (4.1) Using activated charcoal such as Darco 20/40, spread a coating ⅛ inch thick on the surface of the sheet.
  (4.2) Preheat the coating and the sheet to 400° F for 3 minutes
  (4.3) Press at 400° F for 3 minutes at pressure of 200 psi
  (4.4) Cool at 50° for 3 minutes at a pressure of 200 psi
(5.0) To laminate sheets 114 and 113 with copper conductor 115, sheets 123 and 124 with copper conductor 125.
  (5.1) Sprinkle a small amount of a mixture of 60% grade 1112 graphite between the copper screen and the two sheets.
  (5.2) Preheat at 400° F for 3 minutes.
  (5.3) Press at 200 psi at 400° F for 3 minutes.
  (5.4) Cool at 50° F at 200 psi for 3 minutes.
(6.0) To laminate the coated electrodes 132, 133, 134 to the assemblies made per (5.0) above and to the sheet 134.
  (6.1) Preheat the assembled parts to 350° F for 3 minutes
  (6.2) Press at 350° F for 3 minutes at 80 psi.
(7.0) The passages 109, 209, 100, 200 which carry conductive electrolyte need to be insulated as they pass through the electrodes 110, 130, and 120. This is accomplished as follows.
  (7.1) Mix 95% PVF copolymer (Kynar 3584) with 5% graphite (Dixon grade 1112).
  (7.2) Trowel a slab 3/16 thick
  (7.3) Preheat to 400° F for 7 minutes
  (7.4) Press at 400° F for 7 minutes at 135 psi.
  (7.5) Cool at 50° F for 7 minutes at 135 psi.
  (7.6) Cut into plugs 1/64 smaller in diameter than the holes in the electrodes themselves.
  (7.7) Insert plugs into the holes in the electrode sheet.
  (7.8) Preheat electrode sheet and the plug to 400° F for 7 minutes.
  (7.9) Press at 400° F for 7 minutes at 116 psi.
  (7.10) Cool to 50° F for 7 minutes at 116 psi.
(8.0) Fluid passages 101, 102, etc., are cut as grooves into gaskets 143, 144, 153, 154, etc.
(9.0) Stacks of cells are made up and in so doing the mating surfaces are coated with a sealant/adhesive (with coatings applied on grooved gasket faces above and below the groove—e.g. above and below groove 101/102 in FIG. 2) to prevent liquid leakage. The grooved gasket faces butt against the membranes 145, 155. Pressure plates (not shown) are applied at the ends of the stack and tied together with long bolts to compressively grip the cell stack together in a manner well known in the art.

Figure 3:
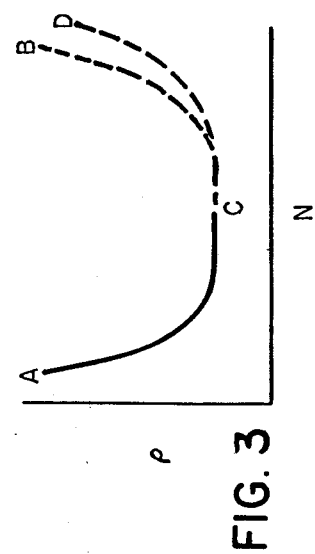
FIG. 3 is a linear-linear graph showing resistivity of a conductive solution as a function of solute concentration.

FIG. 3 indicates the general relation of resistivity to concentration of conductive solute in the anolyte or catholyte solutions (expressed in normality). Resistivity is high at low concentrations (point A) low at some mid-range (point C) and rises at higher concentrations (points B, D) the exact curve shape varying for different solutions. Many solutions reach saturation at the low resistivity mid-range and additional solute precipitates out to prevent a rise of resistivity. Additional solute elements such as sulfuric acid or alkali metal sulfates or hydroxides can be added to the anolyte and catholyte solutions as ionic conductivity aids to reduce resistivity losses at stages of fuel cell operation when initially high anolyte and catholyte principal solute concentration is depleted to low levels.

Figure 4:
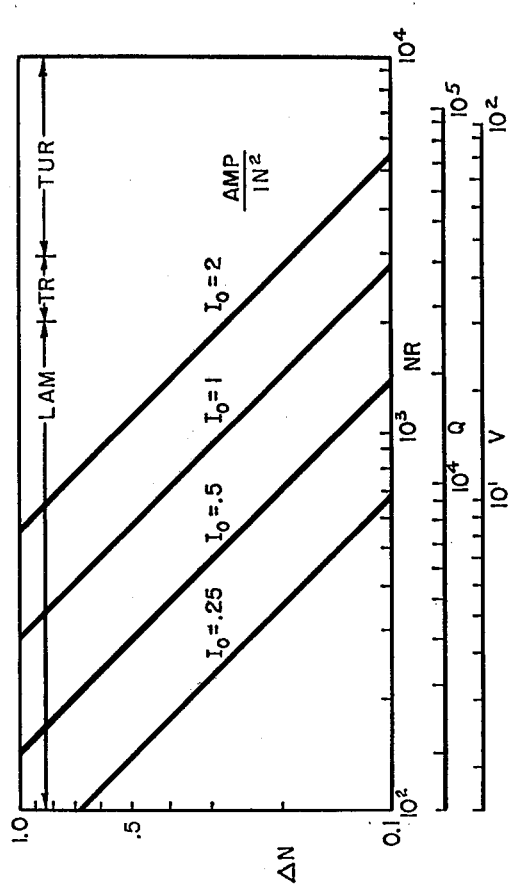
FIG. 4 is a log-log graph showing the relation of change in normality of conductive solution to flow conditions (through a fuel cell) at different current drain rates.

FIG. 4 is a logarithmic plot of % change of normality per pass of a circulating electrolyte plotted against flow rate (expressed in volume flow, linear flow and Reynolds number on alternative x-scales) plotted at different current drain rates. While universally applicable to solutions, it ignores leakages across barriers and inefficiencies or losses of the energy conversion process of a particular solution-electrode combination and must be adjusted to that extent. The curve is based on the cell whose manufacture is described in detail above, using 1/16 inch square grooves 101, 102, etc. which constitute the limiting path for purposes of volume flow to linear flow and Reynolds number calculation and can be varied in obvious fashion for cells with larger or smaller limiting flow paths. Subject to such adjustments, the plot shows laminar flow (LAM), transition flow (TR) and turbulent flow (TUR) regimes of operation for a fuel cell. Fuel cell operation should be controlled to stay within the laminar flow regime for efficient pumping of the recirculating electrolytes. The current drain rates ($I_o$) of the different curves shown are 0.25, 0.50, 1.0 and 2.0 amperes per square inch of electrode surface (of one electrode).

It is evident that those skilled in the art may make numerous modifications and uses of and departures from the specific embodiments described herein without departing from the inventive concept hereof. Accordingly, it is intended that the invention shall be construed as embracing each and every novel feature and novel combination of features present in or possessed by the apparatus or process therein described and that the foregoing disclosure shall be read as illustrative and not as limiting except to the extent set forth in the claims appended hereto.

What is claimed is:
1. Fuel cell comprising, in combination,
    anode and cathode forming means,
    means forming plural, interleaved anolyte and catholyte compartments with anode and cathode respectively positioned therein,
    ion transport means interconnecting each adjacent part of said anolyte and catholyte compartments,
    means supplying and circulating liquid anolyte and catholyte solutions through said compartments essentially continuously,
    said anolyte solution comprising a solute ion selected from the class consisting of sulfite and bisulfite, and
    wherein said catholyte comprises a persulfate solute,
    and wherein the anolyte and catholyte solutes have a common cation,
    whereby a common affluent species is produced by operation of the fuel cell.

* * * * *

UNITED STATES PATENT OFFICE
CERTIFICATE OF CORRECTION

Patent No. 4,117,204  Dated September 26, 1978

Inventor(s) Ralph Zito, Jr.

It is certified that error appears in the above-identified patent and that said Letters Patent are hereby corrected as shown below:

Column 8, line 36, please change "affluent" to --effluent--.

*Signed and Sealed this*

*Nineteenth* Day of *December 1978*

[SEAL]

Attest:

RUTH C. MASON
*Attesting Officer*

DONALD W. BANNER
*Commissioner of Patents and Trademarks*